United States Patent [19]

Ferris et al.

[11] 4,191,107
[45] Mar. 4, 1980

[54] ARTICULATED RAILWAY CAR

[75] Inventors: Ray L. Ferris, Thornton, Ill.; Walter J. Marulic, Gary, Ind.

[73] Assignee: Pullman Incorporated, Chicago, Ill.

[21] Appl. No.: 948,116

[22] Filed: Oct. 2, 1978

[51] Int. Cl.² .............................. B61F 3/08; B61F 5/14
[52] U.S. Cl. .................................................. 105/4 R
[58] Field of Search ........... 105/3, 4 R, 199 R, 199 C, 105/199 A, 238 R, 244, 207

[56] References Cited
U.S. PATENT DOCUMENTS

| 1,599,474 | 9/1926 | Koch | 105/4 R |
| 1,599,477 | 9/1926 | Lazar | 105/4 R |
| 2,708,887 | 5/1955 | Van Alstine | 105/3 R |
| 3,216,370 | 11/1965 | Kulieke | 105/4 R |
| 3,399,631 | 9/1968 | Weber | 105/4 R |
| 3,513,592 | 5/1970 | Ernst | 105/4 R |
| 3,650,219 | 3/1972 | Seely | 105/4 R |
| 3,687,084 | 8/1972 | O'Leary | 105/4 R |
| 3,789,770 | 2/1972 | List | 105/168 |

Primary Examiner—Richard A. Bertsch
Attorney, Agent, or Firm—Richard J. Myers

[57] ABSTRACT

An articulated railway car includes end to end body units with adjacent ends supported on a wheeled truck and interconnected in articulated relation. Side bearing arrangements disposed on opposite sides of the articulated connection include relatively interengaging and telescoping bearing elements designed to prevent torsional twisting movement of the body units about a longitudinal axis.

9 Claims, 10 Drawing Figures

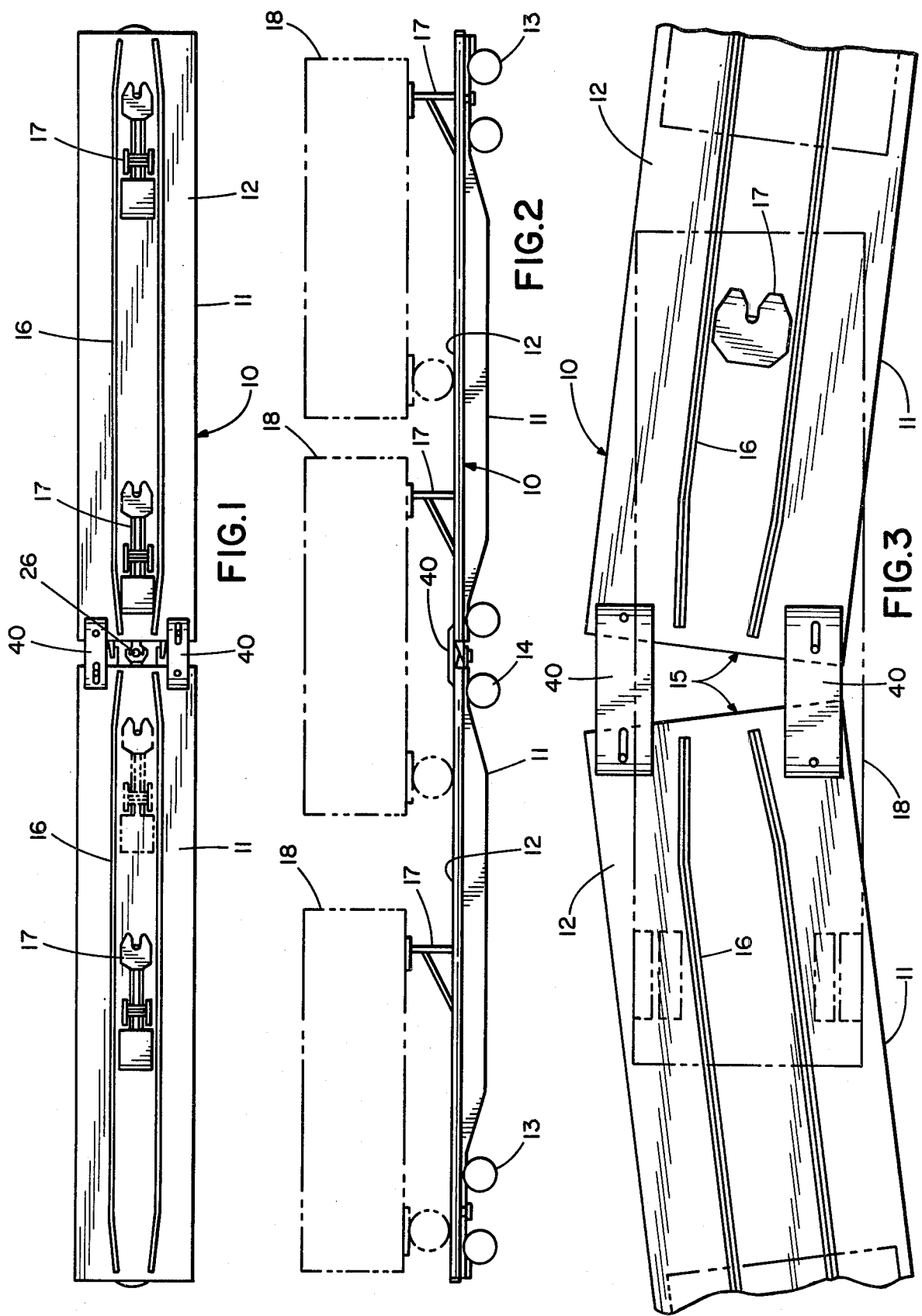

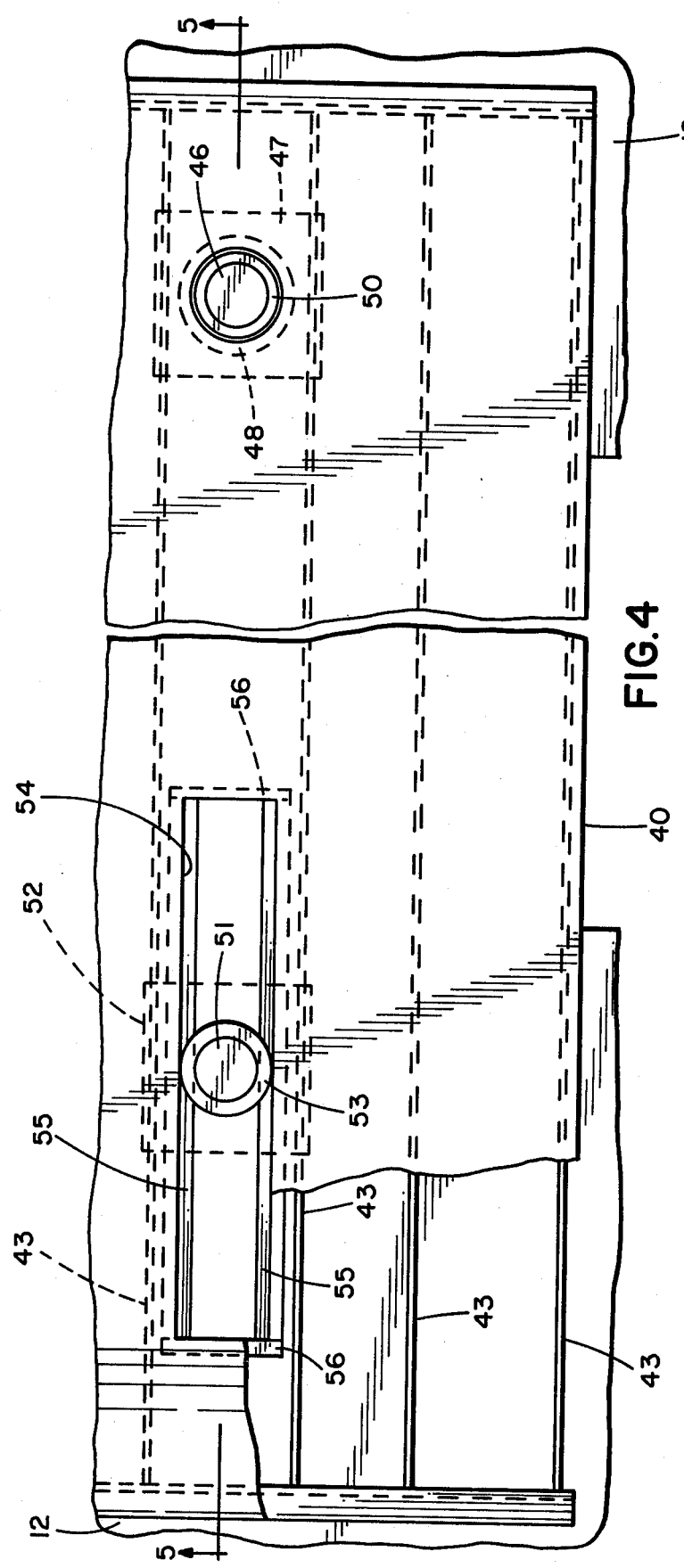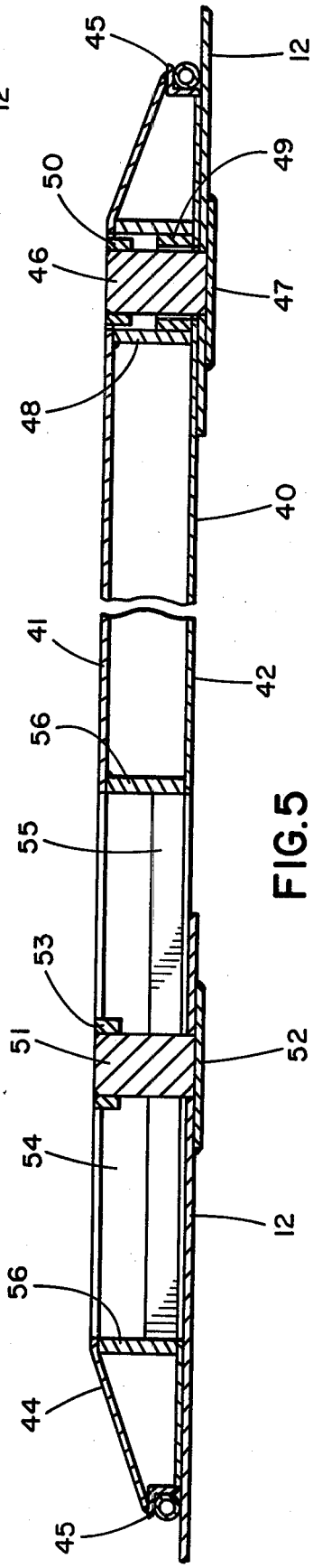

ARTICULATED RAILWAY CAR

BACKGROUND OF THE INVENTION

1. Field of the Invention

The present invention relates to railway cars and more particularly to an articulated car having a pair of end to end car bodies interconnected in articulated fashion. More specifically the invention relates to an improved side bearing arrangement for interconnected articulated body units of a railway car.

2. Description of the Prior Art

The prior art is exemplified in such patents as U.S. Pat. No. 1,599,474 Sept. 14, 1926, U.S. Pat. No. 1,599,477 Sept. 14, 1926, U.S. Pat. No. 2,708,887 May 24, 1955, U.S Pat. No. 3,216,370 Nov. 9, 1965, U.S. Pat. No. 3,399,631 Sept. 3, 1968, U.S Pat. No. 3,513,592 May 26, 1970, U.S Pat. No. 3,650,219 Mar. 21, 1972, U.S. Pat. No. 3,687,084 Aug. 29, 1972, U.S. Pat. No. 3,789,770 Feb. 5, 1974.

SUMMARY OF THE INVENTION

An articulated railway car includes a pair of car body units of the trailer supporting type positioned in end to end relationship. The adjacent ends are interconnected by means of a vertical articulated connection. The outer ends of the body units are supported on conventional car trucks and a car truck of similar design is supported midway of the car to support the adjacent ends of the body units. The present improvement includes bearing assemblies which are connected to the adjacent ends of the car and which interengage each other in relative mating relation. The bearing assemblies are provided with arcuate or curved segments which are radially disposed from the pivot pin of the articulated connection in a radial plane so as to conform in curvature and in intermating or telescoping relation during the travel of the car around a curve on the track in which it is supported. The arrangement of the bearing assemblies is such that relative torsional twisting of the car body units relative to each other is prevented. Further the improved railway car includes flat bridge plates which are pivotally connected to one of the body unit segments and pivotally connected to the other body unit about a pivot which also permits relative sliding movement by means of an elongated slot provided in each of the bridge plates.

BRIEF DESCRIPTION OF THE DRAWINGS

FIG. 1 is a plan view of an articulated railway flat car suitable for carrying highway trailers and the like;

FIG. 2 is a side elevational view of the railway car shown in FIG. 1 disclosing a plurality of highway trailers supported thereon;

FIG. 3 is an enlarged plan view of a pair of adjacent body units of an articulated car showing the articulated relation of the body units as the car enters a curved track;

FIG. 4 is a fragmentary plan view of a bridge plate for the articulated car;

FIG. 5 is a cross-sectional view taken substantially along the line 5—5 of FIG. 4;

DESCRIPTION OF THE PREFERRED EMBODIMENT

Figure 6:
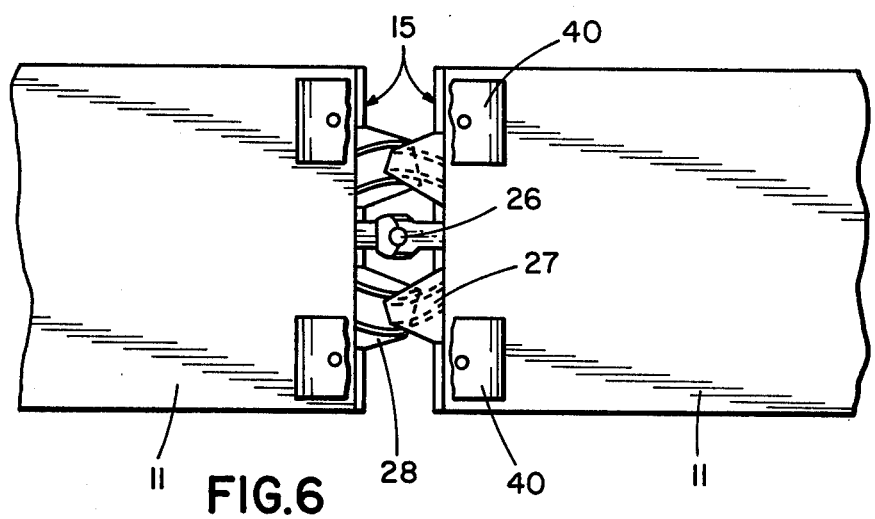
FIG. 6 is a plan view of a pair of articulated body units disclosing the interengagement of side bearing assemblies.
Figure 8:
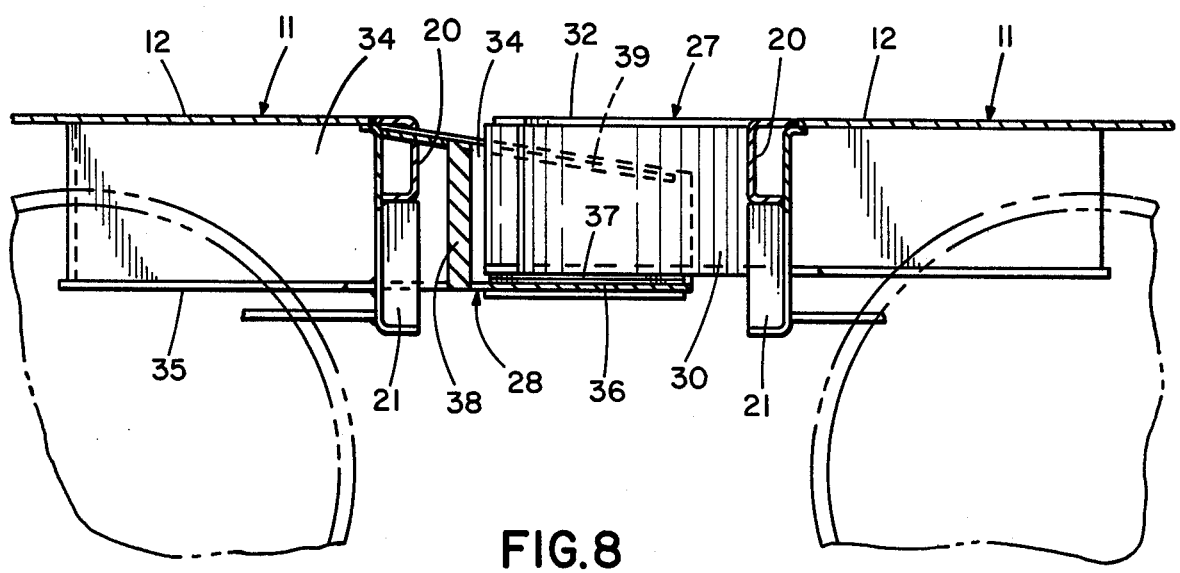
FIG. 8 is a cross-sectional view taken substantially along the line 8—8 of FIG. 7.

Referring particularly to FIGS. 1-3, an articulated railway flat car 10 includes a pair of car body units 11 positioned in end to end relation. Each unit includes a trailer deck 12 and is provided at opposite ends with car trucks 13. A car truck 14 is disposed to support adjacent ends of the car body units 11. The adjacent ends 15 thus are suitably supported by the articulated truck unit 14.

Figure 7:
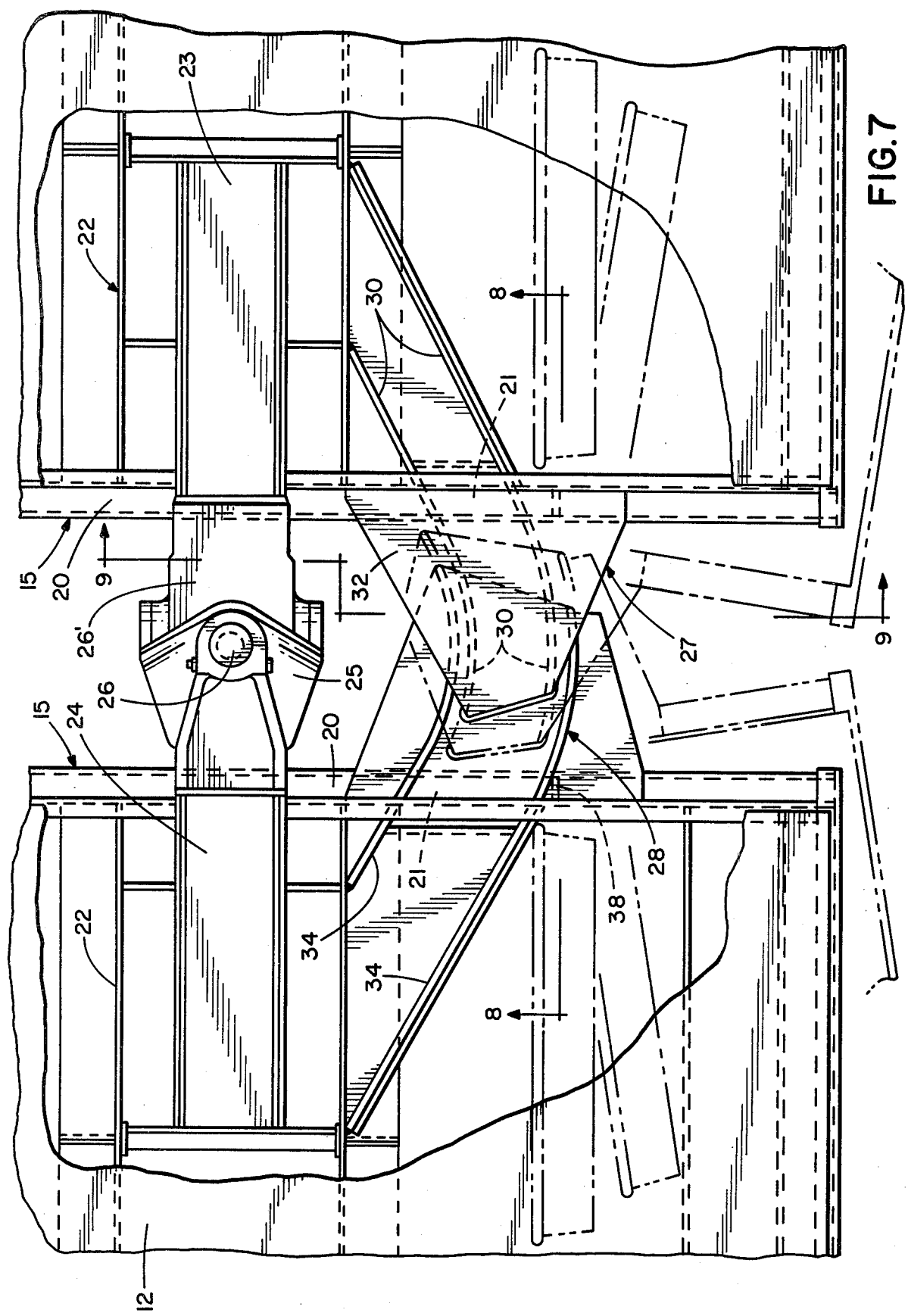
FIG. 7 is an enlarged view similar to FIG. 6 showing the bearing assemblies on one side of the articulated car in interengaging relations.

The railway flat car 10 is particularly suited for supporting over the highway trailers and includes conventional guide rail 16 and a plurality of trailer hitches 17. As best shown in FIG. 2, trailers 18 are suitably connected to the trailer hitches 17 which, in this particular view, are shown in the upright position. Each of the car body units 11 of the flat car 10 includes side sills 19 and the adjacent ends 15 include front channels 20 connected to the side sills and extending inwardly with respect to the flat car. The channels 20 have connected thereto vertical flange plate members 21 projecting downwardly with respect thereto. As best shown in FIG. 7, central portions of the car body units at their adjacent ends are provided with box support structures 22. The box support structure 22 carries support beams 23 and 24 designed to provide for the articulated connection of the car body units. The support beam 24 is provided with an articulating socket 25 which is adapted to receive vertical pin 26 also extending through a tongue 26' connected to the beam 23. The tongue 26' is seated within the socket 25 and also is suitably apertured to receive the pin 26 to provide for the vertical articulated pivotal connection disclosed.

Figure 9:
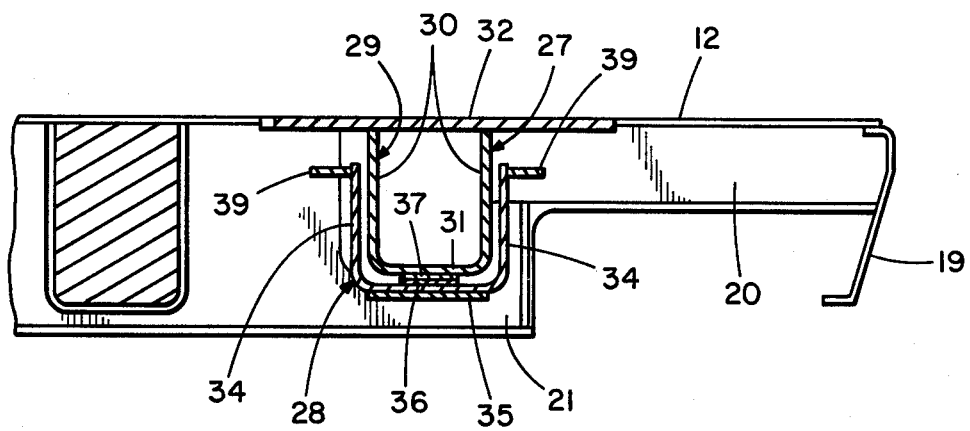
FIG. 9 is a cross-sectional view taken substantially along the line 9—9 of FIG. 7.
Figure 10:
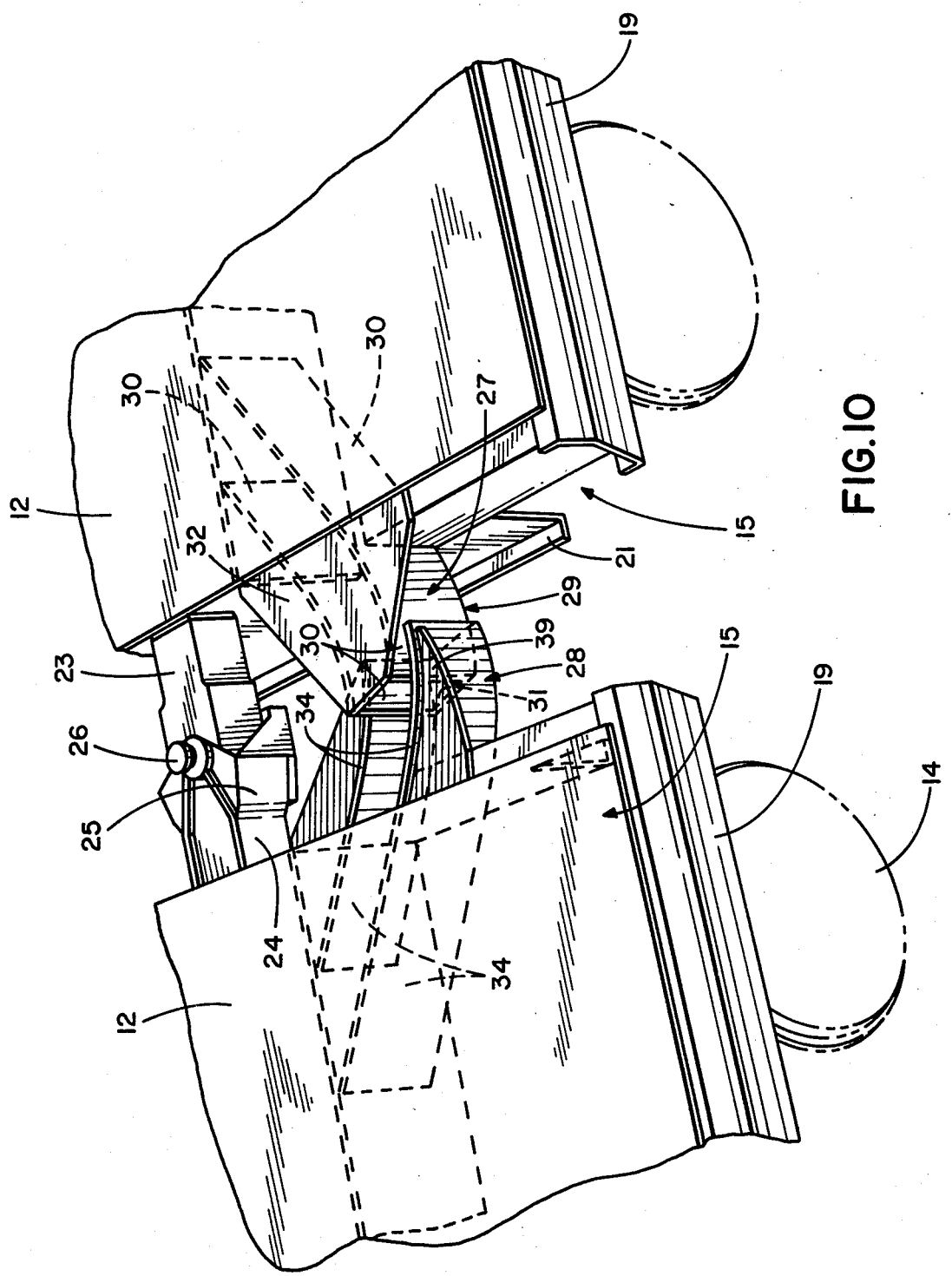
FIG. 10 is a perspective view of the structure shown in FIG. 7.

Referring now particularly to FIGS. 6-10, a pair of male and female bearing arrangements, 27 and 28 respectively are provided on the car body units 11 on their adjacent ends 15. The bearing arrangement 27 includes a housing structure 29 consisting of a pair of vertical spaced walls 30 suitably connected by means of a bottom wall 31 and to a top plate 32. The vertical walls 30 are of arcuate shape or they may be curved so that they conform to a radial plane extending vertically and disposed outwardly from the vertical pin 26. The housing structures 29 are suitably supported on the right adjacent end of the articulated body unit as shown in FIG. 10. The bearing arrangement 28 as shown in FIG. 10 which is supported on the left hand body unit 11 includes vertical wall 34 connected to a bottom wall 35 to provide a relatively channel shape construction. The vertical walls 34 and bottom wall 35 are also suitably curved to conform to the radial plane aforementioned whereupon articulation of the units is such that they conform to the radial plane established by the rotation of the units about the vertical axes of the articulated connection.

As best shown in FIG. 9, the bottom walls 31 and 35 are suitably separated and in sliding engagement by means of wear plates 36 and 37 connected to their respective walls. As best shown in FIGS. 9 and 10, the vertical walls 34 of the channel shaped bearing arrangement is also provided with outwardly extending and horizontal structural reinforcing plate flanges 39.

Referring now particularly to FIGS. 1, 3, 4 and 5, an improved and novel bridge plate arrangement is disclosed which will cooperate with the bearing arrangement to provide the improved structure disclosed. The bridge plate 40 comprises an upper plate 41 and a lower plate 42 connected together by means of a plurality of longitudinally extending vertical supports 43 which are spaced longitudinally inwardly from downwardly tapering portions 44 of the upper plate 41. The ends of the portions 44 are reinforced by a means of angle and pipe combinations 45 and provide for ease in rolling the trailer wheels of an over the highway trailer over the bridge plate from one body unit to the other. As best shown in FIGS. 4 and 5, each bridge plate is pivotally connected to one of the body units by means of a vertical pivot pin 46 which is suitably connected to the deck structure 12 by means of a plate 47 as best shown in FIG. 5. The pins 46 project upwardly and extend through a collar or bearing 48 provided in the bridge plates. Each of the collars 48 also has provided with a bearing retainer 49 which prevents upward removal of the bridge plates in view of a retainer ring 50 secured to the upper end of the pivot pin 46. Each of the bridge plates is also secured to the flat car deck 12 by means of a pivot 51 and plate 52 securely welded to the underneath side of the flat car deck 12. The pin 51 includes an upper retainer 53 and each plate is provided with an elongated slot 54 which permits longitudinal movement of each bridge plate relative to the pivot pin 51. A pair of vertical plates or slide guides are provided below the retainer ring 53 on the bridge plates having connected thereto it opposite ends thereof stop plates 56.

THE OPERATION

As shown in FIGS. 1–3, the trailers 18 are supported on the articulated car with one of the trailers spanning the adjacent ends of the body units. As the car 10 enters a curved track, the body units 11 pivot relative to each other about the articulated pivot pin in connection 26. The side bearing members 27 and 28 are continually in interlocking, mating or telescoping relation as best shown in FIGS. 7 and 9. In this manner, the normal rock and roll action of the interconnected body units is greatly diminished so that the body units work or rock together, rather than independently of each other. The side bearings 27 and 28 in their interengaging relation provide strong structure and allow for articulation which decreases torsional twisting of the trailer body about the longitudinal axis.

In combination with the improved articulated connection, there are provided the novel bridge plate arrangements 40 which are best shown in FIGS. 1, 4 and 5. As indicated, the pin and slot arrangement disclosed permits the bridge plates 40 to slide relative to the body units as the articulated car enters curved track. The sliding bridge plate is particularly important for accommodating the trailer which is bridging the articulated connection or adjacent ends of the car. The standard type of bridge plate which is non-sliding would interfere with the underneath side of the trailer when lifted and if the conventional bridge plate would be allowed to remain down, it would interfere with the rub rail or track guides or protrude beyond the side sills of the car when negotiating a curve. As noted, however, the present bridge plate pivots at one end and is allowed to slide or pivot at the opposite ends thus providing distinctive improvements over the prior art.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In an articulated railway car including a pair of car body units arranged in end to end relation,
   a truck underlying adjacent ends at said body units for supporting the same and including a pair of wheeled axles positioned respectively under the adjacent ends of said units,
   means projecting outwardly from the adjacent ends of said body units and being interconnected to provide a vertical articulated connection for said car; the improvement of a side bearing arrangement supported on the adjacent ends of said body units on opposite sides of said articulated connection, said arrangement comprising,
   first male bearing element projecting outwardly from one of said adjacent ends,
   second female bearing elements projecting outwardly from the other of said adjacent ends,
   said bearing elements being in telescoping sliding engagement with one another and interconnected to prevent rotation of one body unit with respect to the other body unit about a longitudinal axis of said car.

2. The invention in accordance with claim 1,
   said first and second pairs of bearing elements being disposed on laterally opposite sides of said articulated connection.

3. The invention in accordance with claim 2,
   said pairs of bearing elements including vertical interengaging bearing walls curved in a radial vertical plane through said vertical articulated connection.

4. The invention in accordance with claim 2,
   said one pair of bearing elements ends including a lower horizontal arcuate wall and vertical arcuate walls connected in channel shaped relation, each of the other pair of said bearing elements including a second lower horizontal arcuate wall and second vertical arcuate walls disposed between said first vertical arcuate wall.

5. The invention in accordance with claim 4,
   including slide wear pads between said horizontal walls and said other pair of bearing elements each including an arcuate top wall connecting said second vertical walls to provide a box-like structure.

6. The invention in accordance with claim 1,
   said railway car including a pair of bridge plates spanning the adjacent ends of said body units, and each bridge plate being disposed on opposite sides of said articulated connection.

7. The invention in accordance with claim 6,
   each bridge plate including pivotal connections to said body units providing for pivotal movement of said bridge plates relative to said units about vertical axes.

8. The invention in accordance with claim 7, said pivotal connection including a stationary pivotal connection for connecting each plate to each body unit,
   and a sliding pivotal connection for connecting each plate to each body unit.

9. The invention in accordance with claim 8, said sliding pivotal connections each including a slot in each bridge plate.

* * * * *